H. KRIPPENE.
ANIMAL TRAP.
APPLICATION FILED SEPT. 20, 1912.
1,070,267.
Patented Aug. 12, 1913.
2 SHEETS—SHEET 1.
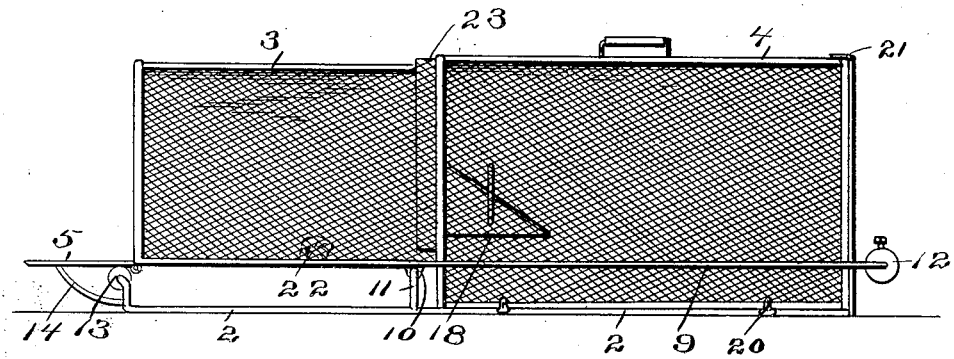
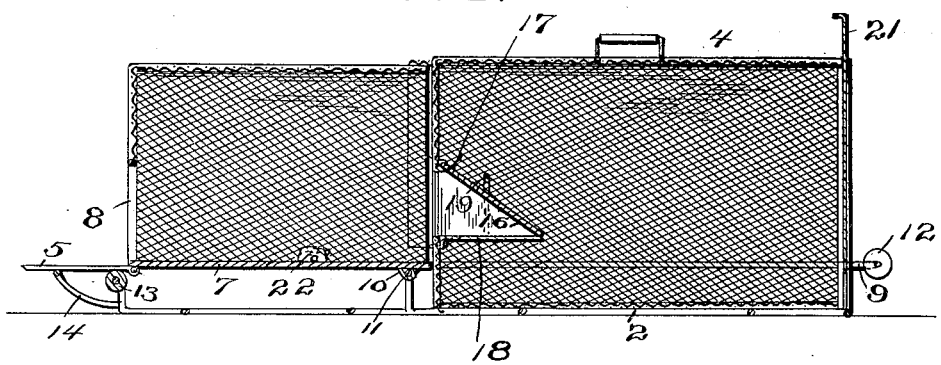
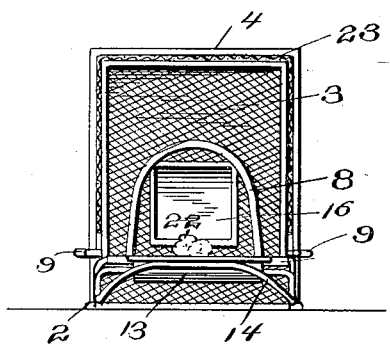
Inventor
Herrman Krippene.

H. KRIPPENE.
ANIMAL TRAP.
APPLICATION FILED SEPT. 20, 1912.
1,070,267.
Patented Aug. 12, 1913.
2 SHEETS—SHEET 2.
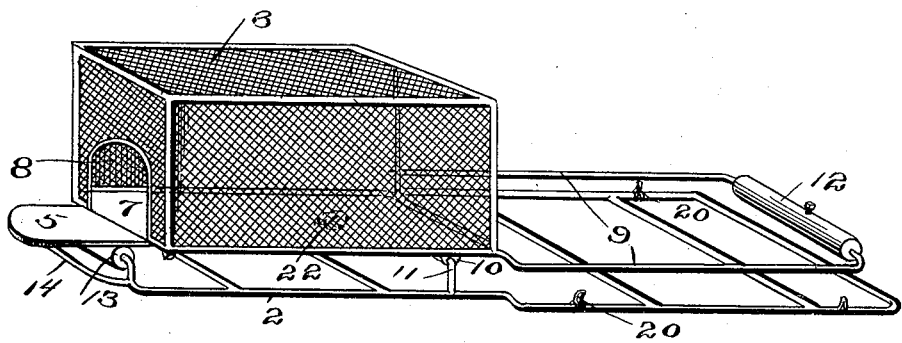
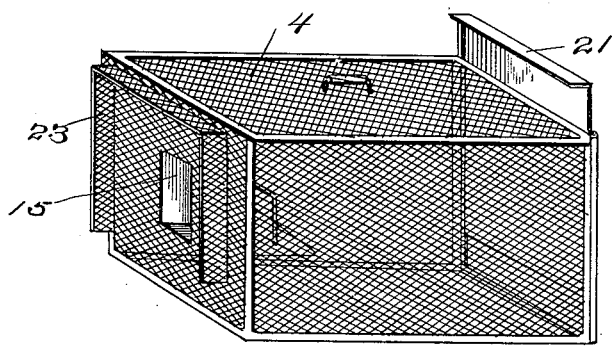
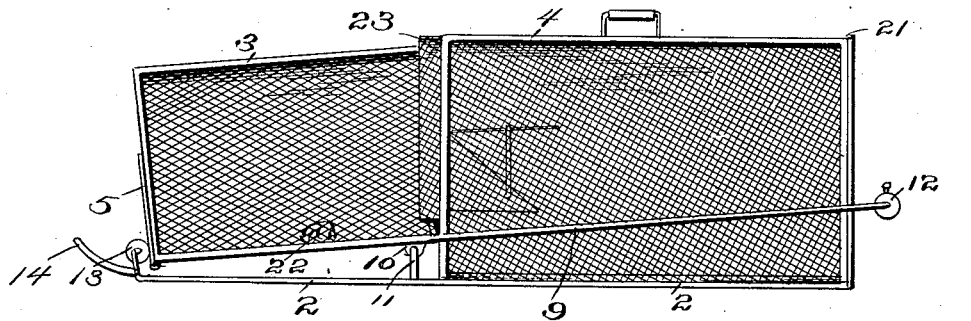
Witnesses
R. S. Trogner
J. C. Dyson
Inventor
Herrman Krippene,
By Mason Fenwick & Lawrence
Attorneys

UNITED STATES PATENT OFFICE.

HERRMAN KRIPPENE, OF OSHKOSH, WISCONSIN.

ANIMAL-TRAP.

1,070,267.

Specification of Letters Patent.  Patented Aug. 12, 1913.

Application filed September 20, 1912. Serial No. 721,466.

*To all whom it may concern:*

Be it known that I, HERRMAN KRIPPENE, citizen of the United States, residing at Oshkosh, in the county of Winnebago and State of Wisconsin, have invented certain new and useful Improvements in Animal-Traps, of which the following is a specification.

My invention relates to improvements in animal traps, and the objects of my invention are to provide a more perfect and complete automatic trap and to provide a means of readily unloading the animals from the trap.

In the drawings I have illustrated an adaptation of my invention to rat traps or mouse traps.

Figure 1 is a view of the device in side elevation. Fig. 2 is a view chiefly in vertical longitudinal section. Fig. 3 is a front view. Fig. 4 is a perspective view with the removable portion detached. Fig. 5 is also a perspective view showing the detached portion. Fig. 6 is a view in side elevation showing a portion of the device in its tilted position.

Similar numerals refer to similar parts throughout the several views.

2 represents the supporting frame, 3 the trap cage and 4 the removable cage.

5 represents the drop door hinged to the bottom of the imperforate floor 7 below the opening 8 in the trap cage 3.

9 represents a lever which extends both sides and rear around the entire trap.

11 represents an angular rod extending upwardly from the side rails of the frame on each side and across through a trough 10 attached to the floor 7 beneath. The side rods of the lever 9 are attached to and carry the floor 7 and rock on the rod 11.

12 represents a counterbalance extending across the rear and carried by the lever 9. The adjustment of the counterbalance 12 is delicate so as to properly operate the door 5. The door 5 is hinged below the bottom of the floor 7. When the door is down or open it operates as a platform for the animal to step upon. As the animal enters the opening 8 his weight tips the front end of the trap downward rocking on the rod 11. The counterbalance 12 is then raised closing the door 5. As the front end of the trap is started downward the door impinges against the rollers 13 attached to the side rail of the frame and is forced upwardly.

14 represents an upwardly extending curved brace attached to the frame and is only for the purpose of effectually supporting the door when down. The entire rear end of the trap cage is open. The removable cage is closed toward the trap cage except for the opening 15 leading to the drop door 16. The drop door 16 is hinged at 17 and is adapted to drop by gravity to the intermediate floor 18 located above the floor of the removable trap. The floor of the removable trap is below the level of the imperforate floor 7. The arch 19 limits the upward movement of the drop door 16.

20, 20 represents hooks attached to the frame on each side and adapted to confine the movable cage. The hooks may be released and the cage easily removed to dispose of the contents. A rear vertical sliding door 21 is provided for the purpose of unloading the contents. The bait 22 is located upon or above the floor 7. As the animal enters the door his weight drops the front of the trap cage. The door is then closed automatically impinging against the roller 13. This action pushes the animal along. He enters the opening 15, raises the door 16 and drops to the floor of the removable trap. This action releases the weight upon the floor 7 and the counterbalance drops to automatically lower the front door and set the trap.

23 represents a guard attached to the removable cage for the purpose of closing the side and top openings as the trap cage is rocked forward.

The trap is constructed of open woven wire entirely except the imperforate floor 7. When the cage 4 is removed, the entire rear end of the trap cage is open for baiting the trap.

Having thus described my invention, what I claim is

1. In a trap, a frame, a second frame pivotally mounted thereon at a point substantially midway between the ends of the frame first mentioned, a receptacle having an opening at each end thereof carried by one end of the second frame, a door for one of the openings including an upwardly projecting device, means carried by the first frame for closing the door upon the tilting of the second frame, a second receptacle arranged to have communication with one of the openings of the receptacle first mentioned, and a weight carried by the second frame at the end opposite to that carrying said first mentioned receptacle.

2. In a trap, a frame, a receptacle mounted thereon, means for detachably connecting the receptacle to the frame, a second frame pivotally mounted on the frame first mentioned and extending about the sides of the receptacle, a weight carried by one end of the second frame, a second receptacle mounted at the opposite end of the second frame, and having an opening leading to the other receptacle, a roller mounted above the base of the frame first mentioned, a principal entrance and door for the second receptacle, said door being closed by the pressure of the roller upon the tilting of the second frame and receptacle, due to the weight of an animal entering the trap, and the weight causing the tilted frame to assume its normal position when the animal passes to the receptacle first mentioned.

3. A trap, comprising two receptacles located end to end and having openings in adjacent ends, one of the receptacles being tiltable and having a principal entrance, means for closing the entrance, a member projecting from one of the receptacles and extending about the sides of the other receptacle for closing the open space between the receptacles when one of the latter is tilted, and means for causing the tilted receptacle to assume its normal position.

4. A trap, comprising two receptacles, located end to end and having openings in adjacent ends, one of the receptacles being tiltable and having a principal entrance, means for closing the entrance, a member projecting from one of the receptacles and extending about the sides of the other receptacle for closing the open space between the receptacles when one of the latter is tilted, and means for causing the tilted receptacle to assume its normal position, said means last mentioned comprising a U-shaped frame passing about the sides of one of the receptacles, and a weight carried by the frame and located at one end of the said receptacle.

In testimony whereof I affix my signature in presence of two witnesses.

HERRMAN KRIPPENE.

Witnesses:
A. R. WATERHOUSE,
ED. MARQUARDT.